United States Patent
Nethery (10) Patent No.: US 9,906,034 B2
(45) Date of Patent: Feb. 27, 2018

(54) POWER GENERATION AND CONTROL SYSTEM

(71) Applicant: Stanton Kee Nethery, Sebastopol, CA (US)

(72) Inventor: Stanton Kee Nethery, Sebastopol, CA (US)

(*) Notice: Subject to any disclaimer, the term of this patent is extended or adjusted under 35 U.S.C. 154(b) by 258 days.

(21) Appl. No.: 14/755,182

(22) Filed: Jun. 30, 2015

(65) Prior Publication Data

US 2015/0303696 A1 Oct. 22, 2015

Related U.S. Application Data

(63) Continuation of application No. 12/544,338, filed on Aug. 20, 2009, now Pat. No. 9,083,173.

(60) Provisional application No. 61/136,342, filed on Aug. 28, 2008.

(51) Int. Cl.
| | |
|---|---|
| *H02J 9/00* | (2006.01) |
| *H02J 3/30* | (2006.01) |
| *H02J 3/38* | (2006.01) |
| *H02H 3/00* | (2006.01) |
| *H02J 11/00* | (2006.01) |
| *H02H 11/00* | (2006.01) |

(52) U.S. Cl.
CPC .............. *H02J 3/38* (2013.01); *H02H 3/003* (2013.01); *H02J 11/00* (2013.01); *H02H 11/008* (2013.01); *H02J 2003/388* (2013.01); *Y02B 10/14* (2013.01); *Y02E 10/56* (2013.01); *Y10T 307/615* (2015.04); *Y10T 307/636* (2015.04); *Y10T 307/724* (2015.04)

(58) Field of Classification Search
USPC .................................................... 307/64, 68
See application file for complete search history.

(56) References Cited

U.S. PATENT DOCUMENTS

| | | |
|---|---|---|
| 4,103,493 A | 8/1978 | Schoenfelder |
| 5,268,850 A | 12/1993 | Skoglund |
| 5,532,525 A | 7/1996 | Kaiser et al. |
| 5,536,976 A | 7/1996 | Chuchill |
| 5,684,710 A | 11/1997 | Ehlers et al. |

(Continued)

OTHER PUBLICATIONS

SmartHomeUSA.com, "How X10 Works", http://www.smarthomeusa.com/info/x10theory/#theory, 2007

(Continued)

*Primary Examiner* — Rexford Barnie
*Assistant Examiner* — Dru Parries
(74) *Attorney, Agent, or Firm* — Diederiks & Whitelaw, PLC (57) ABSTRACT

A power generation and control system is easily installed in a consumer household, a business, or and end-user establishment for generating power and preventing power from flowing to a power grid from a consumer circuit during a power outage. A communications transceiver is adapted to transmit an enabling signal for enabling power generation only after the control system has been installed. The control system can be adapted to replace an existing circuit breaker in a household circuit box and prevents power from traveling from consumer power generators to the grid during a power outage. In the same manner that end-users can add appliances to existing circuits, end-users can easily add additional power generation devices without hiring a professional electrician and without worrying about causing harm to utility workman during power outages.

16 Claims, 5 Drawing Sheets

(56) References Cited

U.S. PATENT DOCUMENTS

| | | |
|---|---|---|
| 5,977,659 A | 11/1999 | Takehara et al. |
| 6,320,732 B1 | 11/2001 | Norman et al. |
| 6,583,521 B1 | 6/2003 | Lagod et al. |
| 7,030,514 B2 | 4/2006 | Wareham et al. |
| 2002/0003379 A1 | 1/2002 | Wilhelm |
| 2002/0036430 A1 | 3/2002 | Welches et al. |
| 2003/0051476 A1 | 3/2003 | Reno |
| 2003/0075982 A1 | 4/2003 | Seefeldt |
| 2004/0169972 A1 | 9/2004 | Goss |
| 2009/0073726 A1 | 3/2009 | Babcock |
| 2009/0225501 A1 | 9/2009 | Luebke et al. |

OTHER PUBLICATIONS

Wikipedia "ZigBee", http://en.wikipedia.org/wiki/ZigBee#Controversy, 2007.

HomePlug Powerline Alliance, Inc., "HomePlug AV White Paper", pp. 1-11, 2005.

POWER GENERATION AND CONTROL SYSTEM

CROSS-REFERENCE TO RELATED APPLICATIONS

The present invention is a continuation application on U.S. patent application Ser. No. 12/544,338 entitled "Power Generation and Control System" filed Aug. 20, 2009 which claims the benefit of U.S. Provisional Patent Application Ser. No. 61/136,342 entitled "Power Generation and Control System" filed Aug. 28, 2008.

BACKGROUND OF THE INVENTION

1. Field of the Invention

The present invention pertains to the art of power generation and power generation control systems and, more particularly, to power generation and power generation control systems that can be easily installed in a consumer household, a business or other end-user establishment.

2. Discussion of the Prior Art

In general, large centralized grids or networks are utilized to provide power to multitudes of consumer households, businesses and other end-users. Distribution of electric power from power plants to households and businesses is conducted over a network of utility lines connected to each residence and business. A standard consumer household, business or end user establishment has a consumer circuit that includes an end user circuit breaker that controls power to numerous individual circuits, each with its own circuit breaker. Generally, three-phase power is split into two sets of circuit breakers, one per phase, or two separate power phase groupings of circuit breakers. Should something happen to a specific circuit, that individual breaker opens and halts the flow of power to the device that failed. Should that individual circuit breaker fail, an upstream breaker opens and cuts the flow of power to all the circuits in the home business or end-user establishment.

Each of the large centralized grids is interconnected with various generating stations and substations that supply power to various loads and monitor utility lines for problems. Each of the large grids has a number of disadvantages, including reliance upon certain vital connections to power plants, as well as distribution difficulties during peak power demand periods. One solution to power supply problems is to install one or more power generating devices at a consumer's residence or business. In some instances, it is desirable to feed extra power generated by such devices back into the centralized grid, where the power may be shared. Such devices preferably include photovoltaics, wind power, hydroelectric generators and fuel cells, along with conventional and variable speed diesel engines, Stirling engines, gas turbines, micro-turbines and hybrid vehicles. Additionally, storage systems, such as batteries, super-conducting, flywheel, pumped water and capacitor types, may also provide power during outages. However, there are a number of problems associated with utilizing such power generation and storage devices. For example, the engineering, permitting and installation costs for a solar panel power generation and control system can be as much as the cost of the equipment being installed. Much of the installation cost results from the necessity of developing engineering documents, obtaining permits and hiring a qualified installer or electrician to connect the system to the centralized power grid based on particular engineering and building code specifications. Each end-user electrical system typically has the same components: a power generation system, a connection to the utility grid, safety systems and, preferably, an energy storage device. Although most end-user electrical systems are conceptually the same, each one requires a custom installation. Household appliances such as lamps, radios, stoves, etc. are also connected to the power grid but, unlike power generation systems, any consumer can buy and install such appliances without the need for developing engineering documents and hiring qualified installers such as an electrician.

Although there are many reasons why end-user power generation systems require a custom installation, one major reason they are not "plug and play" in the same way as appliances is that, if during a power grid outage, the end-user power generation system was to feed power back to the grid, it would become a danger to utility workers handling power lines. Household appliances such as lamps, radios, stoves, etc. present no such risk because they do not generate or provide power and, therefore, consumers may install them without developing engineering documents, obtaining permits or hiring an electrician. More specifically, when a utility line needs maintenance or repair, the lines are disconnected from the power grid and the utility workers assume that no power is being supplied to the line. If there is end-user power supplied to the line downstream of a disconnect point, that assumption could be fatal.

Figure 1:
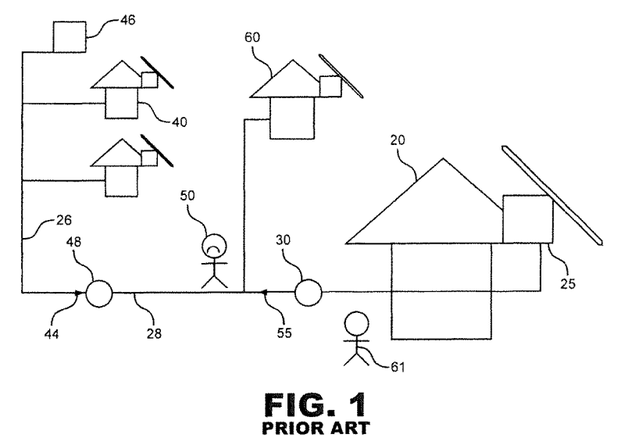
FIG. 1 depicts a situation in which a lineman is endangered by a prior art power generation and control system.

One such scenario is depicted in FIG. 1, showing a consumer household, business or other end-user establishment 20 including an end-user electric power generation system 25 in communication with a power grid 26 via a power line 28. A standard main circuit breaker 30 is provided between end-user electric power generation system 25 and power line 28, which connects to the main power grid 26 through switch 48. As depicted, households 40 are supplied with power 44 produced by a power plant 46. When an outage occurs, power 44 is blocked at switch 48 in order for a utility worker 50 to work on power line 28. However, end-user supplied power indicated by arrow 55 from electric power generation system 25 may continue to flow through power line 28, endangering the utility worker 50, and may even flow into an end-user establishment 60. This situation shows the importance of hiring a qualified electrician 61 when installing prior art electric power generation system 25.

One solution to such a problem is set forth in U.S. Patent Application Publication No. 2002/0036430 directed to a local area grid for distributed power. The '430 document notes that a utility can impress a "kill" signal on main power grid lines for power conditioning unit disconnect from a grid for servicing. This connection allows power utilities to monitor and track power flow. However, such a system requires expensive installation by trained professionals and relies on an external signal to be sent by the utility in order to provide a measure of safety for utility line workers.

Based on the above, there is a need for an end-user power generation and control system allowing for the transfer of power between an end-user installable power generator and a power line that eliminates the possible danger to utility workers and can be quickly and inexpensively installed.

SUMMARY OF THE INVENTION

The present invention is directed to a system that prevents power from flowing back into a power grid during a power outage and prevents end-user installable power generation systems from operating on a power circuit that does not have this protection. As such, the invention provides all the necessary components for power generation systems so that they can be purchased and installed by end-users without the added expense of engineering documents, permits or qualified installers such as electricians.

In a preferred embodiment of the invention, a power generation and control system is easily installed in a consumer household, a business or an end-user establishment; generates power; and prevents power from flowing to a power line from a consumer circuit during a power outage. The end-user electrical system power generation and control system includes a power flow controller for controlling a flow of power between the power line and the consumer circuit. The controller includes an input adapted to be connected to the power line and an output connected to the consumer circuit. A power sensor associated with the controller senses if power is in the power line and a power control switch located between the power sensor and the output interrupts the flow of power between the power line and the consumer circuit when the power sensor senses a power outage in the power line and there is power being generated in the consumer circuit that is flowing to the power line. A communications transceiver is adapted to transmit an enabling signal across the consumer circuit. Alternatively, the communications transceiver is adapted to transmit an enabling signal wirelessly or through separate dedicated wires. The power generation controller includes a power generation transceiver adapted to receive the enabling signal generated by the power line communications transceiver. The power generation controller ensures that the power generation device is enabled only upon receipt of the enabling signal from the power generation device through the consumer circuit connecting the controller and generators. This ensures that the controller is upstream of and controls the specific consumer power circuit of the generator. Once the power generator controller is installed, end-users can easily connect the power generation device without hiring a professional electrician knowing that repairmen will be safe in the event of a power outage.

In another preferred embodiment, a power storage unit is in communication with the power generation device and adapted to store power generated by the power generation device. The power storage unit provides a relatively low voltage power signal to power the power flow controller during an outage and can provide power to start the power generation device. In another preferred embodiment, when the power generation device is not providing power, the power generation device can be activated to supply relatively low voltage power to the power flow controller during a power outage and provide power to activate the power flow controller so that it can isolate the consumer circuit from the power circuit and grant permission to the power generator to supply power to the consumer circuit. This handles the situation when all power is off and the power generator is desired to be on but cannot receive permission to do so from the power controller because the power controller has no power to operate.

In yet another preferred embodiment, the control system is adapted to replace an existing circuit breaker in a household circuit box. As such, the control system includes a circuit breaker that trips when it senses a power overload, thus protecting household electrical equipment on the consumer circuit. The control system may comprise a filter for stopping the enabling signal from entering the power line and another filter for stopping signals traveling from the power line to the consumer circuit such that no external signals turn on the power generating device. However, a filter is not required because the power generator can communicate with the power controller by drawing significant power (e.g., one amp) in an on/off fashion to communicate with the power controller. Because it is drawing power, the main controller can only see this signal if the controller is absolutely upstream of the generator.

The system is installed in a consumer household or a business establishment by installing the control system in the consumer circuit; generating a signal to indicate the presence of the control system; detecting the signal; and enabling the power generation device to provide power only when the signal is detected. Preferably, this method also includes monitoring the power line to determine whether there is power on the power line and preventing power from flowing from the consumer circuit to the power line when there is no power on the power line, while allowing power to flow from the consumer circuit to the power line when there is power on the power line. Preferably, the method also includes supplying power to the control system with a relatively low voltage signal during a power outage. The method allows installation of the power generation device without requiring an electrician to modify the consumer circuit.

Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF THE PREFERRED EMBODIMENTS

Figure 2:
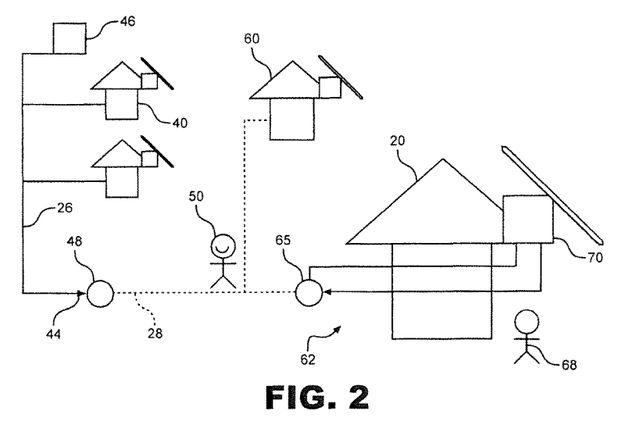
FIG. 2 depicts a situation in which a lineman is safe when a power generation and control system according to a preferred embodiment of the present invention is utilized.
Figure 3:
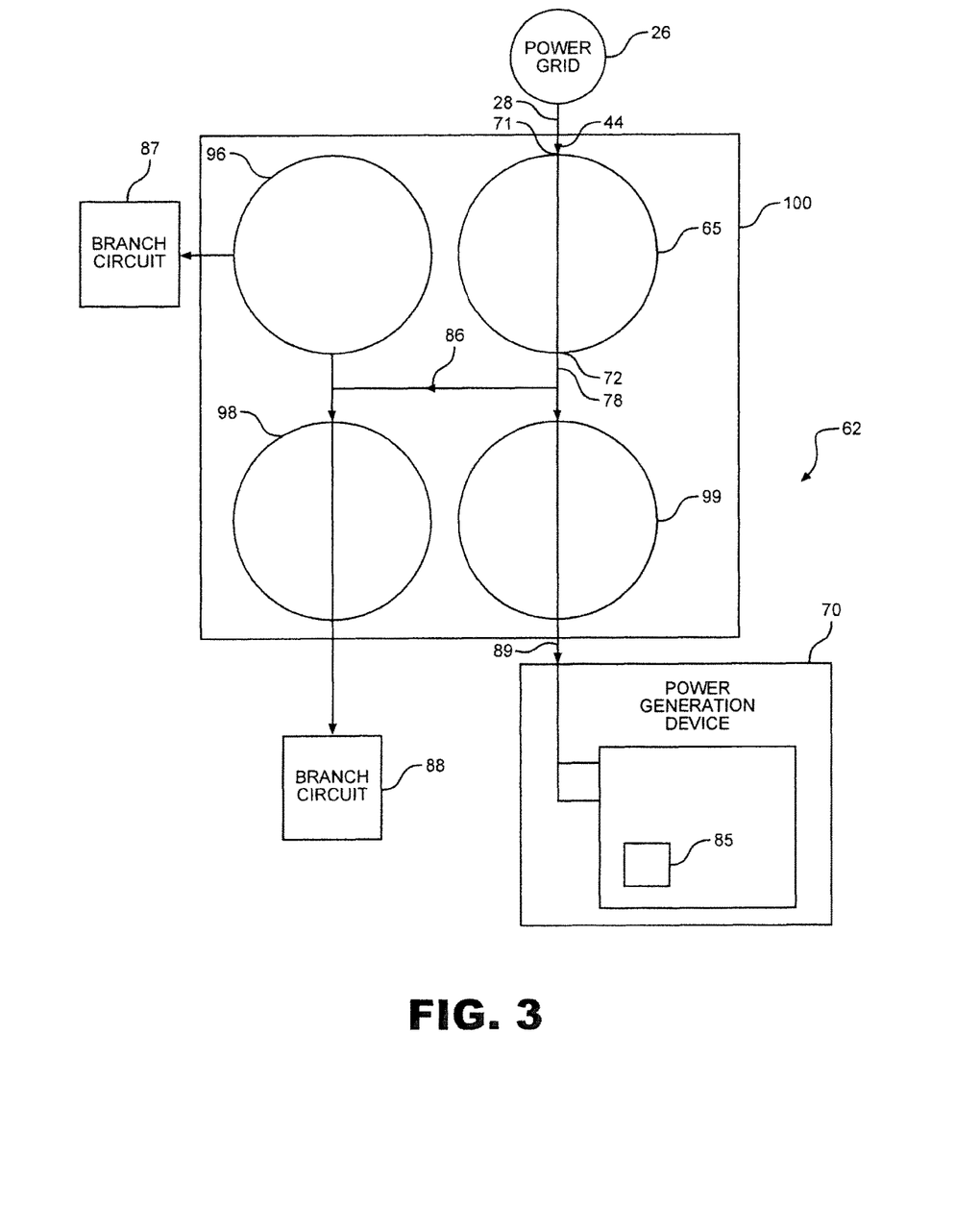
FIG. 3 is a schematic of the power generation and control system of FIG. 2 during a normal power event generally showing a power flow controller and a power generation device.

With initial reference to FIGS. 1-3, a consumer household, business or other end-user establishment 20 is provided with a power generation and control system 62 in accordance with a preferred embodiment of the invention. Power generation and control system 62 is shown in communication with the power line 28, which receives power 44 through switch 48 from power grid 26. A power flow controller 65 of the present invention, provided between an end-user power generation device 70 and power line 28, prevents any undesirable power feedback (corresponding to power feedback 55 shown in FIG. 1) from flowing to power line 28 from power generation device 70. As more fully explained below, power generation device 70 is installable by an end-user 68 and does not require an electrician 61 to install.

An overview of power generation and control system 62 of the present invention is depicted in FIG. 3. Power generation and control system 62 includes power generation device 70 and power flow controller 65. In the preferred embodiment shown, power flow controller 65 has an input 71 connected to line 28 and an output 72 connected to a line 78. Power flow controller 65 constitutes a circuit breaker upstream from power generation device 70. Optionally, a power storage unit 85 may also be utilized, either alone, or as part of power generation device 70. During a normal power event, power flow controller 65 controls the flow of power 44 supplied by power grid 26 through power line 28, and thus controls the flow of power 86 to branch circuits 87, 88 and 89 located downstream of power flow controller 65. Of course, circuits 87, 88 and 89 could be located in a household, a business or in any end-user establishment. In a manner known in the art, individual circuit breaker 96 controls power 86 from output 72 to branch circuit 87, while individual circuit breaker 98 controls power 86 from output 72 to branch circuit 88. Although depicted as a main circuit breaker, it should be understood that power flow controller 65 could optionally constitute a branch circuit breaker between a main breaker and power generation device 70, such as individual circuit breaker 99. Preferably, circuit breakers 65, 96, 98 and 99 are all housed in a household circuit box 100 within household or business 20.

Figure 4:
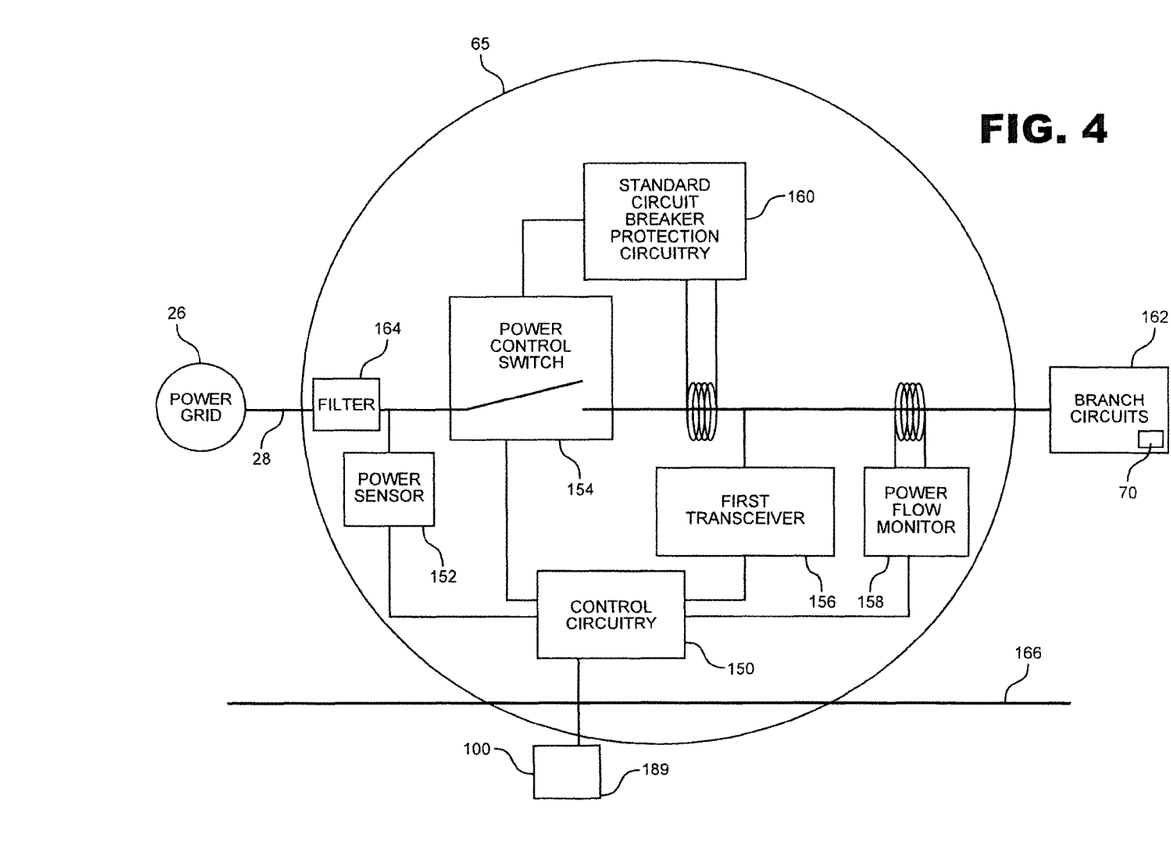
FIG. 4 is a diagram of the power flow controller of FIG. 3.

FIG. 4 will now be referenced in detailing power flow controller 65 of the present invention. Power flow controller 65 includes control circuitry 150 in communication with a power sensor 152, a power control switch 154, a first transceiver 156 and a power flow monitor 158. Although only one switch 154 is shown, it should be understood that additional switches could be utilized in the system. Power sensor 152 senses whether there is power in power line 28. During a power outage, power flow monitor 158 will signal control circuitry 150 of the outage so that power flow controller 65 may respond to the outage. Power control switch 154 is situated to open if power generation device 70 is providing power during a power outage on power line 28, thus separating power generation device 70 from power line 28. Additionally, standard circuit breaker protection circuitry 160 is provided between consumer circuit 162, which includes branch circuits 87, 88 and 89, and power line 28. More specifically, circuit breaker protection circuitry 160 will open a switch, such as power control switch 154, in the event consumer 162 draws too much power.

First transceiver 156 may be, for example, an X10, HomePlug™ or wireless transceiver such as a Zigbee™ transceiver, and is utilized to send signals to and exchange data with one or more power generation devices 70. Optionally, a filter 164 may be provided between transceiver 156 and power grid 26 to prevent transceiver 156 from sending signals to or receiving signals from other end-user establishments 60. Power flow monitor 158 is adapted to determine whether one or more power generation devices 70 downstream of power flow controller 65 supplying power to power line 28. Line 169 represents a neutral power line.

Figure 5:
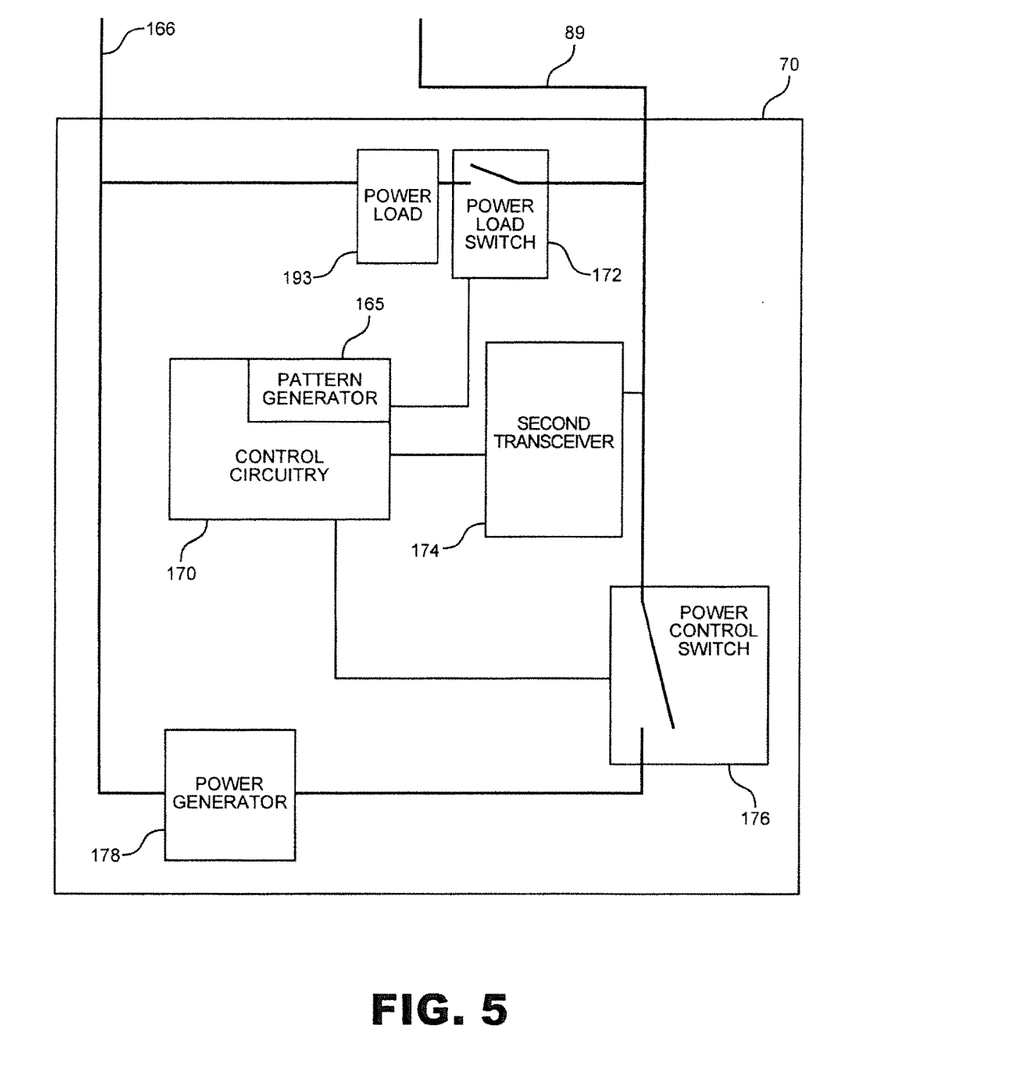
FIG. 5 is a diagram of a power generation device of FIG. 3.

FIG. 5 will now be referenced in detailing power generation device 70 of the present invention. Power generation device 70 includes control circuitry 170 in communication with a power load switch 172 controlling power flow to a power load 173, a second transceiver 174, a power sensor 175, a power control switch 176 and a relatively low voltage power control switch 176. Second transceiver 174 may be, for example, an X10, HomePlug™ or wireless transceiver such as a Zigbee™ transceiver, and is utilized to accept signals from and exchange data with power flow controller 65 upstream from power generation device 70. Alternatively, the two transceivers may communicate through a wire or other communication system. Additionally, a power generator 178 is provided to generate power. In a preferred embodiment of the present invention, generator 178 is in the form of solar panel cells, although it should be readily understood that any type of power generator might be utilized with the present invention. For example, generator 178 may be a group of batteries or a gas/diesel fueled generator or the combination of batteries and fueled generator in a hybrid vehicle.

In a preferred embodiment, power flow controller 65 is adapted for use with multiple power generation devices 70. When consumer 68 desires to install power generation and control system 62, consumer 68 will install or have installed power flow controller 65 between power line 28 and consumer circuit 162. Preferably, a licensed professional electrician 61 will conduct the installation of the power flow controller 65. Once power flow controller 65 is installed, the consumer 68 may choose one or more desired types of power generation devices 70, such as a solar panel type power generator device. Advantageously, after power flow controller 65 is connected, the consumer 68 may install one or more power generation devices 70 without the aid of electrician 61.

In a manner known in the art, when standard circuit breaker protection circuitry 160 of power flow controller 65 senses that too much power is being supplied by power line 28, power control switch 154 is tripped and power can no longer flow between power line 28 and consumer circuit 162.

The manner in which the present invention is utilized in the event of power being supplied by power line 28 and a desire to have power generation device 70 provide power to branch circuits 87, 88, 89 and power line 28 will now be discussed with reference to FIGS. 4-6. Power on branch circuit 89 is sensed by power sensor 175. A request signal to provide power is sent by power generation device 70 via second transceiver 174 to any power flow controller 65. Each power flow controller 65 communicates via first transceiver 156 requesting power generation device 70 to respond with a confirmation that power flow controller 65 is between power generation device 70 and power line 28. In the preferred embodiment, power load switch 172 is toggled on and off by control circuitry 170 so that a signal measured by timed changes in current flow is generated by power load 173 and is sensed by power flow monitor 158. When power flow monitor 158 can sense the timed changes in current flow from power generation device 70, it responds via first transceiver 156 to second transceiver 174 and thus to control circuitry 170 with a signal permitting power generation device 70 to provide power. Control circuitry 170 then closes power control switch 176 allowing power to flow from power generator 178 to branch circuit 89. When power grid 28 is providing power and power generation device is providing more power than is consumed by branch circuits 87, 88 and 89, such excess power from power generation system 70 flows back into power grid 28 for use by others such as households 40 and adjacent house 60. In this example, if individual circuit breaker 98 was also a power flow controller, when power generation device 70 responds to the request for a signal to a power flow controller located at 98, that power flow controller would not sense the response and thus would not respond with permission for power generation device 70 to provide power to branch circuit 89.

The manner in which the present invention is utilized in the event of no power being supplied by power line 28 or to branch circuit 89 and a desire to have power generation device 70 provide power to branch circuits 87, 88 and 89 will now be discussed with reference to FIGS. 4-6. The assumption is that power control switch 154 is closed such that power line 28 is connected to line 78. No power on branch circuit 89 is sensed by power sensor 175. Low voltage power control switch 176 is turned on by control circuitry 170 to put relatively low voltage power onto branch circuit 89. This relatively low voltage power is below the safety threshold of concern for power utilities and is used to provide power to power flow controller 65 when power grid 28 is not supplying acceptable power. The power from low voltage power control switch 176 flows to power flow controller 65 enabling it to open power control switch 154 to isolate power line 28 from consumer circuit 162. A request to provide power is sent by power generation device 70 via second transceiver 174 to any power flow controller 65. Power flow controller 65 communicates via first transceiver 156 requesting power generation device 70 to respond with a signal that confirms that power flow controller 65 is between power generation device 70 and power line 28.

In the preferred embodiment, instead of a power load, power generation device 70 uses relatively low power voltage fluctuations to signal to power flow controller 65 that they are on the same circuit. Low voltage power control switch 176 varies the voltage supplied to branch circuit 89 so that power flow monitor 158 senses timed changes in the relatively low voltage. When power flow monitor 158 can sense the signal from power generation device 70, it responds via first transceiver 156 to second transceiver 174 and thus to control circuitry 170 with a signal permitting power generation device 70 to provide power. Control circuitry 170 then closes power control switch 176 allowing power to flow from power generator 178 to branch circuit 89. Control circuitry 170 then turns off low voltage power control switch 176. In this example, if individual circuit breaker 98 was also a power flow controller, power provided by low voltage power control switch 176 would allow that power flow controller to open its power control switch to isolate branch circuit 88 from line 86. The power flow controller at 98 would cease to receive relatively low voltage power on its downstream branch circuit 88 connection and it would not respond to the request to provide power sent by power generation device 70.

The manner in which the present invention is utilized in the event of a power outage on power line 28 while power generation device 70 is providing power to branch circuits 87, 88 and 89 and power line 28 will now be discussed with reference to FIGS. 4-6. In a manner known in the art, power flow monitor 158 senses that no power is being supplied via power line 28. Control circuitry 150 isolates power line 28 from consumer circuit 162 by opening power control switch 154. Power generation device 70 continues to provide power to branch circuit 89.

The manner in which the present invention is utilized in the event that power generation device 70 is physically disconnected from branch circuit 89 will now be discussed with reference to FIGS. 4-6. In a manner known in the art, power sensor 175 senses that no power is being supplied via branch circuit 89 and that no power is flowing to branch circuit 89. A request to provide power is sent by power generation device 70 via second transceiver 174 to any power flow controller 65. Because no power flow controller is physically connected to power generation device 70, permission is not granted and power generation device 70 opens power control switch 176. Should power generation device 70 be reattached to a branch circuit that is not protected by a power flow controller, it will not put power onto that unprotected branch circuit.

Figure 6:
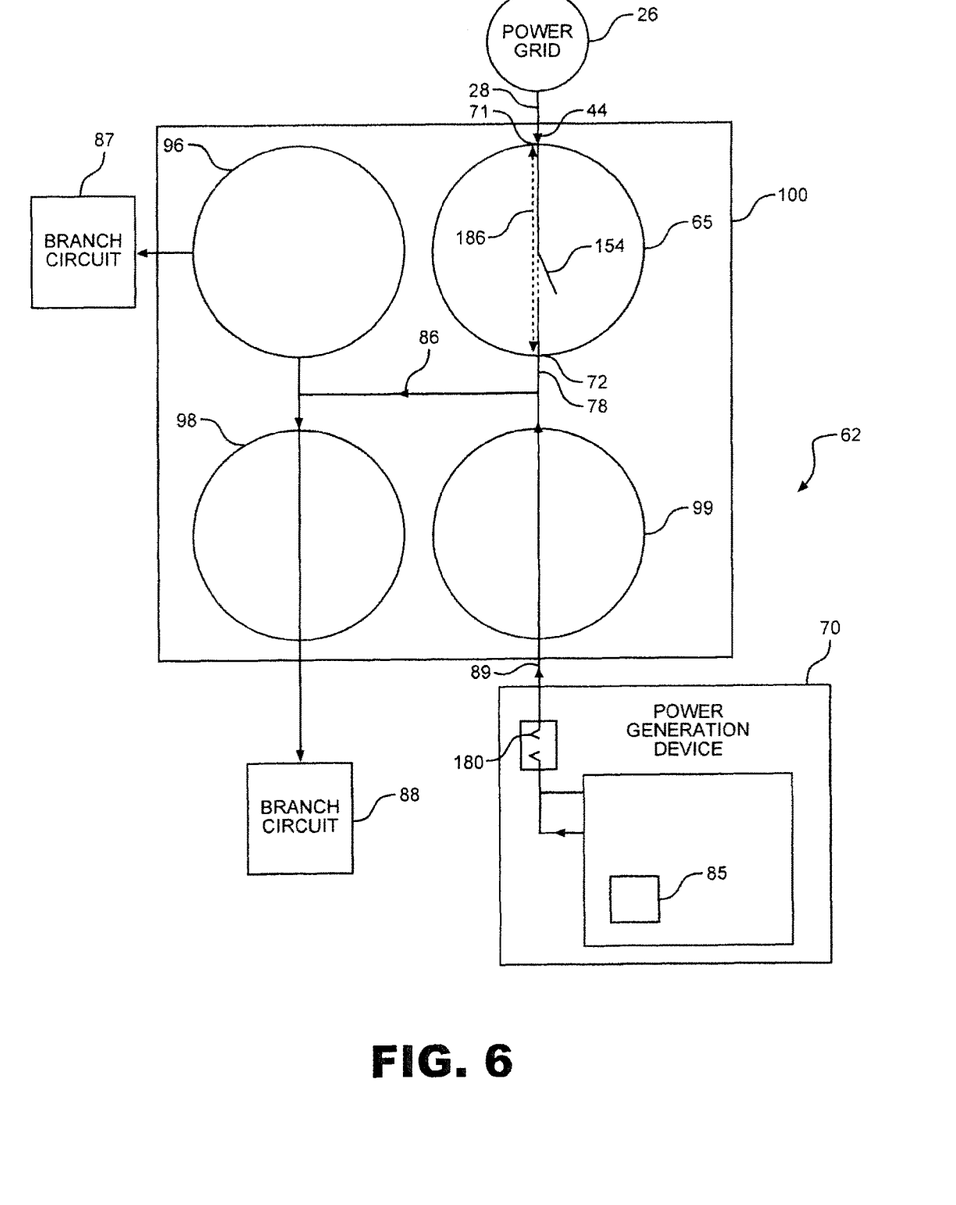
FIG. 6 is a schematic of the power generation and control system of FIG. 2 during a power outage event and also depicting a feedback configuration.

The initial request to provide power signal is sent by second transceiver 174 by power generation device 70 (see FIG. 6). When a power flow controller 65 receives the signal it responds through transceiver 156. The communications between transceiver 156 and transceiver 174 can be transmitted separate from the power lines 89 and 78. An enabling signal 180 must travel through power lines 89 and 78 to confirm that power flow controller 65 protects power line 28 from power generation device 70. Once signal 180 is confirmed, communications between transceiver 156 and transceiver 174 contains information communicating that specialized power flow controller 65 of the present invention is in place, rather than a conventional circuit breaker. When permission to provide power is granted by power flow controller 65 to power generation device 70 via transceiver 156 and transceiver 174, power control switch 176 is flipped, allowing power generated by power generator 178 to flow to consumer circuit 162 in a safe manner. If signal 180 is not received by power flow controller 65, permission to provide power is not granted to power generation device 70 and power control switch 176 will remain in an off or deactivated position, and no power will be provided to consumer circuit 162. Signal 180 is preferably checked for only when power generator 178 is about to be activated. However, the signal 180 may be checked periodically or continuously, in which power generator 178 will only be enabled upon detection of the signal during a signal check. Optionally, a continuous signal may be utilized and is particularly advantageous in a system that experiences frequent power outages.

A user may press an actuator 189 in communication with power flow controller 65 to instigate a signal event that causes all power generation devices granted permission to operate by power flow controller 65, to cease providing power to consumer circuit 162 so that the branch circuits are fully off and can be worked on by a qualified electrician 61.

Although described with reference to preferred embodiments of the invention, it should be readily understood that various changes and/or modifications could be made to the invention without departing from the spirit thereof. For instance, although only one power generation device 70 is depicted, any desirable number of power generation devices may be utilized.

The invention claimed is:

1. A power generation and control system comprising:
a power generation device attached to a branch circuit of a circuit located in an end user establishment; and
a controller configured to control a flow of power between a power grid and the circuit, the controller including:
a power sensor configured to sense the flow of power;
a power control switch configured to interrupt the flow of power when there is no power in the power grid, wherein the power generation device is attached to the branch circuit downstream of the controller, and wherein the system is configured to confirm that the power generation device is downstream from the controller and configured such that the power generation device can only provide power to the circuit if the power generation device has been confirmed to be downstream from the controller.

2. The power generation and control system of claim 1, wherein the branch circuit has a circuit breaker, and the power generation device is attached to the branch circuit downstream of the circuit breaker.

3. The power generation and control system of claim 1, wherein the controller further includes a first transceiver configured to selectively give the power generation device permission to put power onto the circuit.

4. The power generation and control system of claim 3, wherein the power generation device includes a power generation controller having a second transceiver configured to receive permission from the first transceiver, the power generation controller being configured to ensure that the power generation device puts power onto the circuit only when permitted.

5. The power generation and control system of claim 1, wherein the power generation device includes a power generation controller having a pattern generator configured to send a power usage pattern, and the controller further includes a pattern sensor configured to sense the power usage pattern and determine that the power generation device is downstream of the controller.

6. The power generation and control system of claim 1, wherein the controller further includes a circuit breaker.

7. The power generation and control system of claim 6, wherein the controller is configured to replace an existing circuit breaker in a circuit breaker box.

8. The power generation and control system of claim 6, wherein the controller is configured to replace an electrical power meter.

9. The power generation and control system of claim 1, wherein the power generation device includes a generator configured to produce power, the power produced by the generator being used by various loads placed on the circuit and also sent to the power grid through the power control switch.

10. The power generation and control system of claim 6, wherein the generator is selected from the group consisting of photovoltaic generators, wind powered generators, hydroelectric generators, fuel cells, diesel engines, Stirling engines, gas turbines, micro-turbines, hybrid vehicles and combinations thereof.

11. A method of installing and using a power generation and control system, the method comprising:
   installing a controller in an end user establishment;
   attaching a power generation device to a branch circuit of a circuit located in the end user establishment, the power generation device being attached downstream of the controller;
   controlling a flow of power between a power grid and the circuit by:
      sensing the flow of power; and
      interrupting the flow of power when there is no power in the power grid;
   confirming that the power generation device is downstream from the controller; and
   providing power to the circuit with the power generation device only when the power generation device has been confirmed to be downstream from the controller.

12. The method of claim 11, wherein the branch circuit has a circuit breaker, and attaching the power generation device to the branch circuit includes attaching the power generation device downstream of the circuit breaker.

13. The method of claim 11, further comprising:
   selectively giving the power generation device permission to put power onto the circuit.

14. The method of claim 11, further comprising:
   sending a power usage pattern;
   sensing the power usage pattern; and
   determining that the power generation device is downstream of the controller based on the power usage pattern.

15. The method of claim 11, wherein the step of installing the controller is performed by an electrician, and the step of attaching the power generation device can be performed by anyone when the controller is installed.

16. The method of claim 11, further comprising:
   supplying power to the controller with a low voltage signal during a power outage.

* * * * *